Aug. 28, 1962 E. C. KOPPER 3,050,776
NICKEL-POWDER LEVELING APPARATUS
Filed April 21, 1960

INVENTOR.
EDWARD C. KOPPER
BY
George H. Fritzinger
AGENT

United States Patent Office 3,050,776
Patented Aug. 28, 1962

3,050,776
NICKEL-POWDER LEVELING APPARATUS
Edward C. Kopper, Verona, N.J., assignor, by mesne assignments, to The Electric Storage Battery Company, Philadelphia, Pa., a corporation of New Jersey
Filed Apr. 21, 1960, Ser. No. 23,674
1 Claim. (Cl. 18—15)

This invention relates to an improved apparatus for leveling dry carbonyl nickel powder on a traveling conveyor or in molds prior to sintering the powder into formed self-sustaining porous plate-like bodies for carrying the active material of battery electrodes.

Sintered plates for battery electrodes are made as porous as possible from very low density nickel powder comprising pulverized nickel metal and from 0 to 50 percent nickel oxide. The pulverized nickel metal is typically prepared by thermal decomposition of nickel carbonyl or of nickel carbonyl-iron carbonyl mixtures.

Nickel powder has a fibrous structure composed of very fine grains linked end to end. Because of this fibrous structure the powder has a very low apparent density but also very poor flow properties. As a result, upon spreading a heap or layer of the powder as into a mold and leveling the powder with a doctor blade having a relatively sharp leveling edge the powder is formed with a rough surface characterized by fissures, pin holes and other surface irregularities. If a mass of such powder is sintered into a self-sustaining body the latter tends to break or crack easily at the points or lines in the surface of the body. It has become therefore a prerequisite in forming plate-like sintered bodies for battery electrodes that the powder be first spread with a smooth uniform surface prior to sintering.

One approach to the problem of leveling masses of nickel powder with a smooth uniform surface has been to add a suitable processing agent to the dry nickel powder which will give the powder good dry flow properties. Such agent may be polyvinyl alcohol or polyvinylpyrrolidone as taught, for example, by the pending Moulton application Serial No. 751,124, filed July 28, 1958, now Patent 2,964,582. In contrast to this approach to the problem, the present invention resides in an improved mechanical method and apparatus for forming masses of nickel powder with a smooth uniform surface. In particular, the invention is directed to an improved leveling blade which operates to spread the powder and concurrently slightly compact a thin surface stratum thereof to give the resulting surface a smooth uniform texture free of pin holes, fissures and other surface defects.

An object of the invention is therefore to provide an improved means and method of forming masses of dry nickel powder with smooth uniform surfaces. Especially, it is an object to provide a means and method of forming plate-like masses of nickel powder which when sintered into self-sustaining bodies for carrying the active material of battery electrodes, are free of pin holes, fissures and other surface imperfections which might lead to cracking of the finished electrodes.

A further object of the invention is to provide an improved leveling blade for spreading dry nickel powder and forming the same with smooth continuous surfaces of uniform texture and density without need for adding processing agents to the powder to improve its dry-flow properties.

Features of the invention reside in spreading the powder from the center of a layer or heap toward the sides with a flowing motion and in providing the blade with a rounded leveling surface which acts to slightly compact a thin surface layer of the powder with an ironing action to give it a smooth uniform surface.

These and other objects and features of the invention will be apparent from the following description and the appended claim.

In the description of the invention reference is had to the accompanying drawings, of which:

Figure 1:
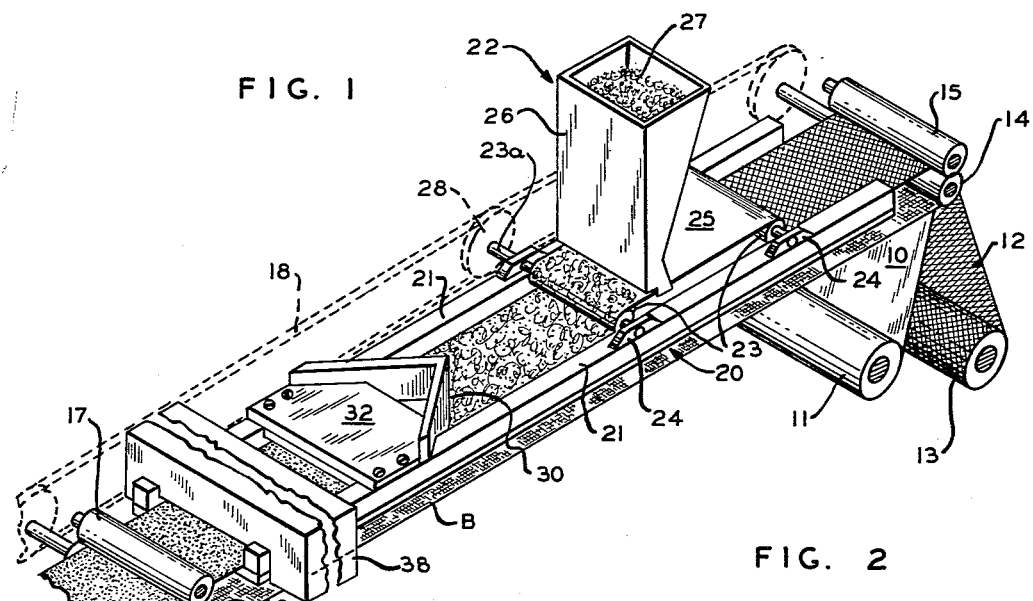
FIGURE 1 is a perspective view of an apparatus for coating a carrier strip with dry nickel powder and sintering the same by a continuous process, wherein the powder is leveled by an improved method and apparatus according to the invention.
Figure 2:
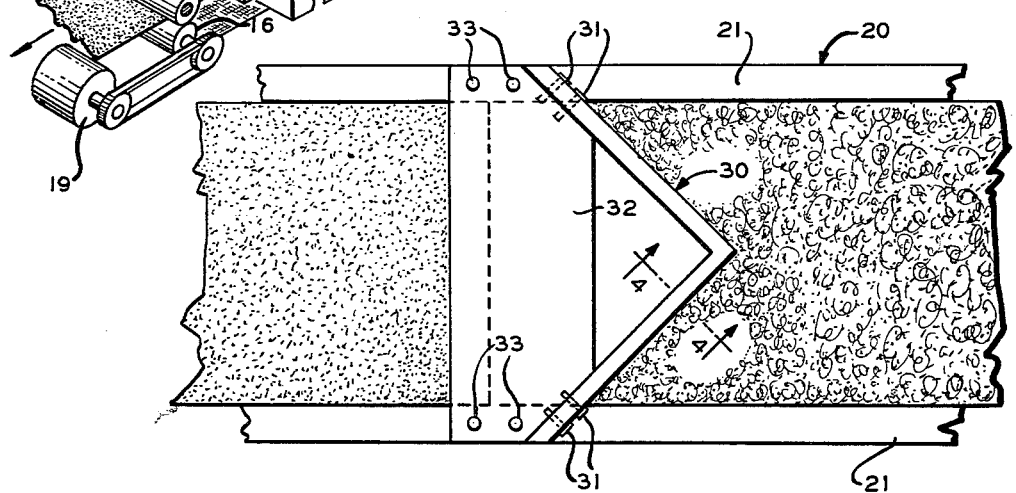
FIGURES 2 and 3 are plan and side elevational views respectively of a portion of the apparatus of FIGURE 1, showing the leveling blade of the invention.
Figure 3:
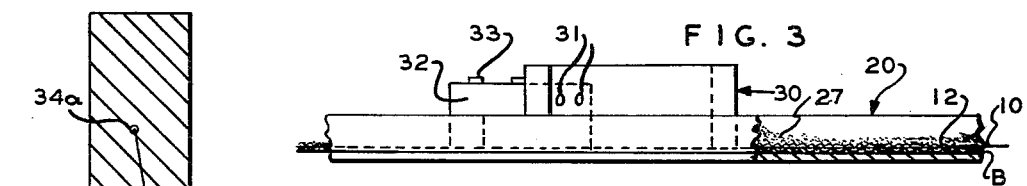

The invention is herein shown only by way of illustrative example in connection with an apparatus for forming and sintering a continuous carrier strip which is to be then cut to size to form individual porous plates or matrices to be impregnated with active material for service as battery electrodes. As shown in FIGURE 1, there is provided a continuous backing strip 10 of smooth finish paper drawn as from a supply roll 11, and a continuous wire screen strip 12 drawn as from a supply roll 13. These two strips are joined one onto the other as they are drawn onto a conveyor belt B and around a drive roller 14 between the conveyor belt and an overlying pressure roller 15. If desired, the wire screen strip may first be drawn through straightening rollers not now however herein necessary to show.

The composite strip of backing paper and overlying wire screen is carried by the upper run of the conveyor belt through a coating and sintering apparatus hereinafter described. The conveyor belt is an endless one of fine wire mesh led around a forward drive roller 16 between this roller and a cooperating pressure roller 17. The two drive rollers 14 and 16 are intercoupled as by a chain belt 18 and driven at a slow speed by a motor 19.

From the back drive roller 14 the composite strip 10—12 is carried by the conveyor belt B across a loading table 20 between two guide rails 21. Supported by the guide rails adjacent the back drive roller 14 is a powder feeding device 22 comprising a pair of transverse rollers 23 journaled in bearings 24 mounted on the side rails. Trained around the rollers 23 is an endless feed belt 25 having a bottom run spaced slightly above the composite strip 10—12. Mounted above the top run of the feed belt is a hopper 26 containing dry nickel powder 27. The hopper is funnel-shaped and provided with an adjustable lower edge not shown which is set at a suitable spacing from the feed belt to cause a layer of nickel powder of desired thickness to be fed out onto the feed belt as the same is revolved around the rollers 23. The shaft 23a of one of the rollers 23 is provided with a pulley 28 in engagement with the chain belt 18 to cause the feed belt 25 to be revolved in a counterclockwise direction, as seen in FIGURE 1, as the composite strip 10—12 is progressively advanced. By this revolving movement of the feed belt nickel powder is fed in a continuous layer from the hopper onto the composite strip 10—12 at a rate set by the adjustment of the hopper. The nickel powder so fed onto the composite strip 10—12 filters through the interstices of the metal screen and covers the screen to a suitable thickness. However, the powder is not evenly distributed onto the screen and must therefore be leveled before the composite strip is fed into a sintering furnace.

The leveling means of my invention comprises a leveling blade 30 preferably of a V shape as viewed from the top, which is positioned symmetrically between the side rails with its apex directed in the line of movement of the composite strip. The two segments of the leveling blade are secured at 31 to a mounting plate 32 which rests on and is secured to the rails as by screws 33. Thus, the half-segments of the blade are oblique to the direction of advance movement of the composite strip and are effective equally to flow excess nickel powder from the center of the composite strip towards the side rails forming side walls on the supporting table for the composite strip. By flowing the nickel powder towards the opposite side walls the layer of powder on the composite strip is formed with straight uniform side edges. If excess nickel powder should build up because of the opening of the hopper being too wide, the excess powder will overflow the side rails at the ends of the leveling blade.

Figure 4:
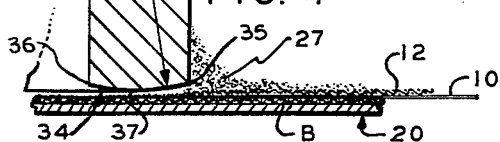
FIGURE 4 is a cross sectional view to enlarged scale of the leveling blade taken on the line 4—4 of FIGURE 2.

The present leveling blade is adapted also to provide the nickel powder layer on the traveling composite strip with a smooth continuous surface free of all mechanical imperfections notwithstanding the tendency of the nickel powder to aggregate into small clusters with surface pin holes and fissures because of its fibrous character and poor-flowing properties. The smoothing action of the present blade is accomplished by making the blade relatively thick and providing it with a rounded polished leveling surface 34 at its bottom side throughout its width dimension. This leveling surface is inclined upwardly at its front side confronting the oncoming nickel powder layer of the composite strip, and it is also inclined upwardly at its back side but to a lesser extent. Preferably, the leveling surface is formed as the segment of a cylinder. In other words, it is generated about an axis 34a above the leveling surface and parallel with the supporting table. However, the axis 34a about which the surface is generated is set back of the vertical medial plane of the blade to provide the greater rise at the front of the blade, as shown in FIGURE 4.

By providing the blade with a wide leveling surface, instead of with a sharp edge characteristic of the usual doctor blade, and rounding this leveling surface with greater rise to a front edge 35 than to a back edge 36 from its lowermost element 37 directly below the axis 34a about which the surface is generated, a leveling action of an ironing nature is produced to provide a smooth uniform surface. In this ironing action a thin surface stratum of the powder coating between the level of the leading edge 35 and the bottom element 37 is slightly compacted to break down the fibrous character of the nickel powder so that it is formed with a smooth polished surface. In this ironing action the smoothing effect of the blade is augmented by the fact that the nickel powder has a definite resilience causing it to spring back after it passes the lowermost element 37 of the blade, and the curved extending surface of the leveling surface back of the lowermost element 37 operates to relieve gradually the compacting pressure of the blade on the powder.

Following the leveling blade 30 of my invention the composite strip 10—12 is fed through a sintering furnace 38. In this furnace the paper backing strip 10 is burned away but tensile strength in the sintered strip is preserved by the wire screen strip 12 embedded in the sintered body. From the furnace 38 the sintered strip is drawn ahead by the conveyor belt B and pressure roller 17, and beyond the conveyor belt the strip is cut as desired by means not herein necessary to show.

It will be understood that although I have illustrated my invention in connection with a continuous forming and sintering apparatus, the leveling blade of my invention may be used as well in connection with stationary carrier strips. For example, the feeder 22 may be moved on the guide rails with the side pulley or gear 28 in mesh with a stationary rack to distribute a layer of nickel powder onto the metal screen, after which the leveling blade 30 may also be moved on the guide rails to level the layer of powder in the manner of my invention. Such formed strips may then be placed individually in a sintering furnace and be then impregnated with active material for use as individual battery electrodes.

The detailed features of my invention herein particularly described are intended to be illustrative and not limitative of my invention since the same is subject to changes and modifications without departure from the scope of my invention, which I endeavor to express according to the following claim.

I claim:

An apparatus for leveling dry nickel powder and providing the same with a smooth surface, comprising a support having parallel side edges for receiving a layer of nickel powder, a V-shaped leveling blade above said support comprising two diverging blade members having rounded leveling surfaces at their bottom sides parallel with said support, said leveling surfaces being generated about an axis above the leveling surface and parallel with the supporting plate, said axis being set back from the vertical medial plane of said blade to provide a greater rise at the front of the blade than at the rear of the blade, and means for providing relative rectilinear movement between said leveling blade and support in the direction of the apex of the blade whereby the front faces of the blade flow the nickel powder from the center of said layer in opposite directions towards said side edges of said support and the curved leveling surfaces of the blade concurrently slightly compact the nickel powder by an ironing action to provide the layer of powder with a smooth uniform surface.

References Cited in the file of this patent

UNITED STATES PATENTS

| | | |
|---|---|---|
| 864,028 | Peters | Aug. 20, 1907 |
| 2,623,239 | Fischbein | Dec. 30, 1952 |
| 2,651,076 | Hornbostel | Sept. 8, 1953 |
| 2,712,154 | Lindquist | July 5, 1955 |